United States Patent [19]

Korsgaard

[11] 4,265,478

[45] May 5, 1981

[54] SAFETY LOCKING MECHANISM FOR WHEELCHAIRS

[76] Inventor: Carl E. Korsgaard, Rte. 2, Smith Rd., Concord, Tenn. 37922

[21] Appl. No.: 37,521

[22] Filed: May 9, 1979

[51] Int. Cl.[3] .................... B60N 1/02

[52] U.S. Cl. .................... 296/65 R; 105/159; 280/242 WC; 410/23

[58] Field of Search .................... 296/65 R, 19; 105/159; 297/45, 379, 433; 280/39, 47, 179 R, 242 WC

[56] References Cited

U.S. PATENT DOCUMENTS

| | | | |
|---|---|---|---|
| 1,835,840 | 12/1931 | Barclay | 296/19 |
| 3,955,847 | 5/1976 | Schiowitz | 296/19 |
| 4,060,271 | 11/1977 | Williams | 296/19 |
| 4,093,303 | 6/1978 | Nelson | 296/19 |

*Primary Examiner*—Richard A. Bertsch

*Attorney, Agent, or Firm*—Pitts & Kesterson

[57] ABSTRACT

Apparatus for use in combination with all types of standard wheelchairs for immobilizing or restraining the wheelchair in a stationary condition when the wheelchair is loaded or carried on a vehicle, transport system or other structure subject to bouncing, random motion or acceleration and deceleration forces is disclosed. Securing and releasing the apparatus may be controlled by the wheelchair occupant and comprises a latching mechanism which attaches to all types of wheelchairs and which is controlled by a lever easily operated by a wheelchair occupant having only minimum use of one hand. A bar which cooperates with and engages the latch on the wheelchair is attached to a standard which in turn is secured to the vehicle, transport system or structure. A preferred embodiment of the invention further includes a back pad and a head rest and shoulder and seat belt which attaches to the standard.

6 Claims, 10 Drawing Figures

SAFETY LOCKING MECHANISM FOR WHEELCHAIRS

BACKGROUND OF THE INVENTION

The present invention relates to wheelchair restraining devices in general and more particular to apparatus which may be attached to all standard types of wheelchairs and which may be operated by the occupant of the wheelchair.

Increased awareness and concern for the need of the handicapped, the ill and the physically incapacitated has resulted in several innovations over the years to ease the burdens of such afflicted people. Of particular value to many of the handicapped or physically afflicted persons today is the modern wheelchair which may be a simple lightweight and collapsable structure which is readily controlled by an occupant having powerful and useful arms to the almost completely motorized chair for the very severely afflicted person having minimum use of his hands and arms. Although such wheelchairs are available and provide great mobility for the occupant, and in many instances may be used in specially designed transport vehicles such as vans, buses, trains etc. it becomes of great importance to immobilize or restrain the wheelchair once aboard such a vehicle to prevent uncontrolled movement of the wheelchair due to acceleration, deceleration, and random motion experienced by the transport vehicle as it travels over a road bed, tracks etc.

Although there are many types of wheelchair restraining devices now available, all of these prior art type restraining devices typically have one or more objectionable characteristics. For example, perhaps the most widely used device for restraining a wheelchair uses two simple U shaped structures attached to short standards which in turn are attached to the vehicle. The U shaped structures then receive the large wheels of the modern wheelchair and a pin is then inserted through one side of the U shaped structure to the other side thereby clamping the wheelchair in position. Although the construction of this device is simple enough, it does have several objectionable characteristics. First of all, it is not operable by the occupant of the wheelchair even if the occupant has complete control and command of his arms and hands. Furthermore, the device only prevents motion in substantially one direction, since it does not prevent bouncing and is therefore damaging to the spokes of the wheelchair. Additionally, the height of the standard and U shaped restraining member is such that it presents a severe hazard for someone falling against the standard when the standards are not being used to restrain a wheelchair.

There are, of course, other types of restraining devices but these too have their own limitations.

For example, U.S. Pat. No. 4,093,303 issued to Eldrid W. Nelson on June 6, 1978, discloses an apparatus for restraining a wheelchair in a stationary position by the use of retaining arms which extend along and around the wheelchairs main wheels and then grip the wheelchair frame at the front. The arms are extendable and retractable and with difficulty may be operated by wheelchair occupants having complete use of their hands and arms. In addition, when not being used they are cumbersome and take up much room and must be folded up out of the way if they are not to provide a storage problem. In addition, because of the complexity of the retractable arms the apparatus would appear to be expensive to manufacture and difficult to maintain in operable condition.

U.S. Pat. No. 4,060,271 issued to Joseph J. Williams on Nov. 29, 1977, discloses a three point tie down arrangement having a quick release. This apparatus is used for restraining wheelchairs in vehicles to prevent the chair from rotating and the wheels from leaving the floor during transit. However, it is clearly seen that this arrangement could in no way be operated by the wheelchair occupant since it is even difficult to manipulate by a person completely unafflicted with physical handicaps. The system is basically an arrangement of chains which are mounted in the floor of the transporting vehicle and which chains are then attached to the cross-members and structural members of the wheelchair itself.

U.S. Pat. No. 3,955,847 issued to Morton I. Schiowitz on May 11, 1976, discloses a simple restraining system comprising a loop or eye securely mounted to the vehicle floor along with two troughs or depression also in the vehicular floor. The troughs or depressions are spaced such that they will receive the wheels of the wheelchair. A steel hook having a threaded end for receiving a thumb screw is mounted to a steel crossbar. In use, the wheelchair is rolled into position into the troughs or depression in the vehicle floor, the crossbar is then secured against the bottom frame members of the wheelchair, the hook is attached to the floor mounted eye bolt and the thumb screw then tightened such that the bar maintains the wheelchair firmly in position. Although this restraining technique is extremely simple, it is readily obvious that the apparatus is not only impossible to operate by the wheelchair occupant, but in fact provides a difficult task for a fully healthy and functioning individual to properly restrain the wheelchair.

As an example of other types of restraining devices for chairs having wheels, U.S. Pat. No. 1,835,840 issued to W. Barclay on Dec. 8, 1931, discloses a chair having wheels for use with a particular vehicle. The chair described in this patent is not the standard wheelchair but is a chair particular adapted for temporary use by an occupant. This apparatus includes a latching mechanism attached to the vehicle itself which engages a keeper mounted to the wheelchair.

SUMMARY OF THE INVENTION

Therefore, it is an object of the present invention to provide simple and inexpensive apparatus for use with standard wheelchairs which can immobilize or restrain such wheelchairs when they are loaded or carried on transport vehicles.

It is a further object of this invention to provide wheelchair restraining apparatus which can be operated by the wheelchair occupant.

It is still another object of this invention to provide a wheelchair restraining apparatus which securely maintains a wheelchair in a stationary condition while the transporting vehicle is undergoing extensive and violent motion without damaging the wheelchair spokes or the wheelchair structure itself.

Briefly, the apparatus of this invention works in combination with a wheelchair and is for use in restraining or securing the wheelchair when it is loaded or carried by transport vehicles such as buses, trains, airplanes or the like when such vehicles may experience unpredictable motion, acceleration forces or bouncing and comprises a mounting standard securely mounted to the floor of the transport vechicle. The mounting standard includes a horizontal bar which is permanently mounted to the standard at a preselected distance above the floor. A latching mechanism which is securely mounted to the wheelchair at the same preselected distance as the horizontal bar engages and couples with the bar to secure the wheelchair. The latching mechanism includes a body and a latching tongue pivotally mounted to the body such that the body and the tongue cooperate to form a channel which may be selectively closed by the pivoting latching tongue such that the tongue and body define an aperature suitable for receiving the horizontal bar. A spring loaded locking pin locks the tongue in the closed position. Also indicated is a means such as a wire flexible cable and squeeze handle for moving the locking pin from the locking position to release the locking tongue.

DESCRIPTION OF THE INVENTION

Figure 1:
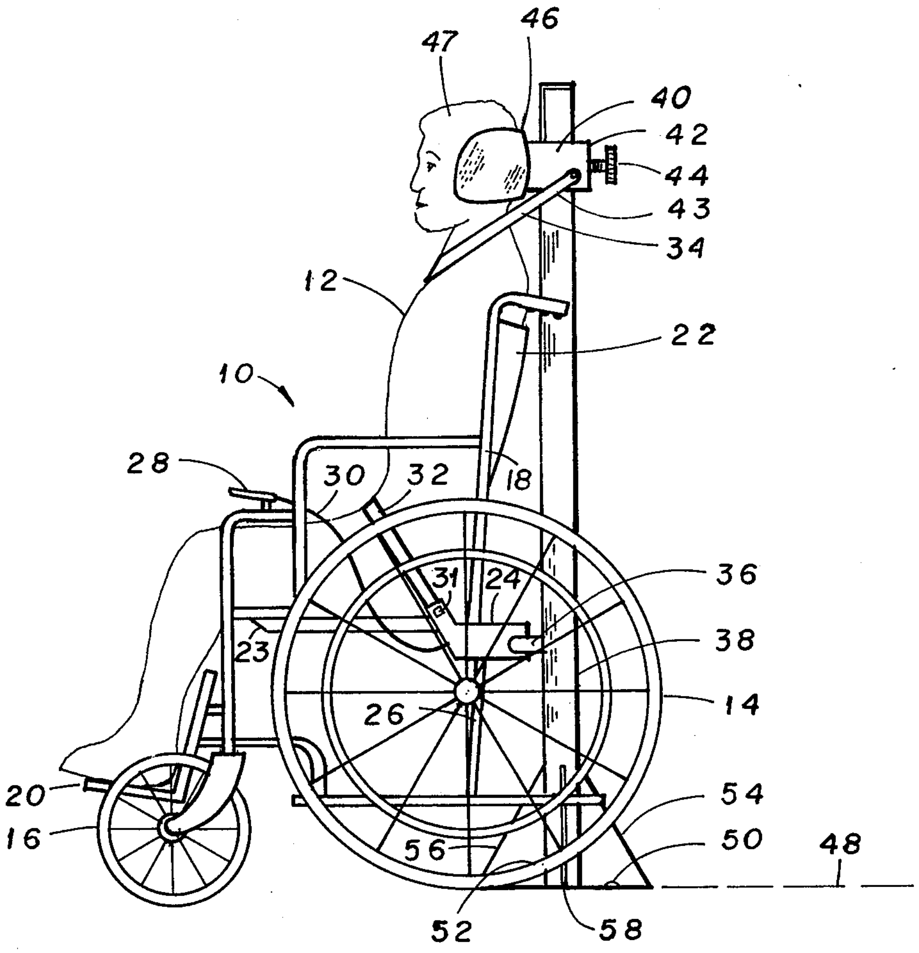
FIG. 1 is a side view showing the apparatus of this invention in combination with an occupied standard wheelchair.
Figure 2:
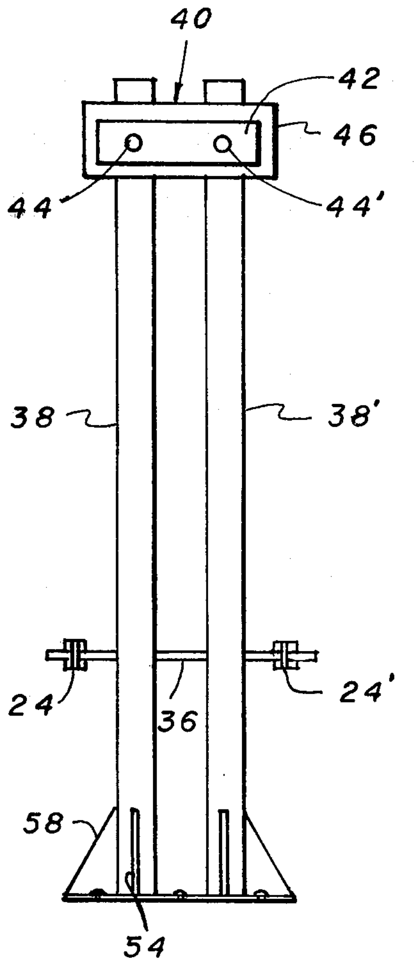
FIG. 2 is a side view of FIG. 1 showing the standards to which the wheelchair attaches and a horizontal crossbar which is engaged by the latch of this invention.

Referring now to FIG. 1 there is shown generally an elevation view of a wheelchair 10 occupied by a person 12. The wheelchair is of the normal type having large rear wheels indicated at 14 and small front caster wheels indicated at 16. Also included is a heavy duty metal frame 18 such as steel or aluminum and a foot rest 20. The person 12 is supported between various of the members of the frame 18 by a fabric back and seat indicated generally at 22 and 23. In combination with the wheelchair 10 is a latching mechanism 24 incorporating the features of this invention. As can be seen, latching device 24 attaches to a vertical frame member 26 of frame 18. Attached to latching mechanism 24 is a squeeze handle 28 and a flexible wire cable 30 used to control the latching mechanism 24. Also attached to the front end 31 of latching mechanism 24 is one end of a seat belt and shoulder belt combination shown as seat belt 32 shoulder belt 34. Latching mechanism 24 engages and couples with horizontal bar 36 which bar is permanently attached to standard 38 by any suitable method such as bolts or welding and the like. Also attached to standard 38 is a head rest 40 which includes an adjustable bracket mechanism 42 with a thumb screw 44 for maintaining the head rest in position. Attached to the adjustable bracket mechanism is a soft resilient cushion 46 for receiving the head 47 of the occupant. Also attached to adjusting mechanism 42 by means of bracket 43 is safety belt 34 previously discussed. Standard 38 is itself securely attached to the support surface 48 of a vehicle or structure by means of bolts 50 and 52. In a preferred embodiment standard 38 is a two pillar standard which includes braces 54, 56 and 58 for additional bracing. Referring now to FIG. 2 there is shown a back view of the standard 38. From this back view, it is clearly seen that the preferred embodiment does include a two pillar standard as indicated by reference numbers 38 and 38'. Likewise, from the back view it can be seen that there are two latching mechanisms as indicated by latching mechanism 24 and latching mechanism 24' which are shown as being coupled or engaged with horizontal bar 36. In a similar manner, it can be seen that the head rest 40 is also supported by the supporting mechanism 42 which in turn is held securely in position by thumb screws 44 and 44'.

Figure 3:
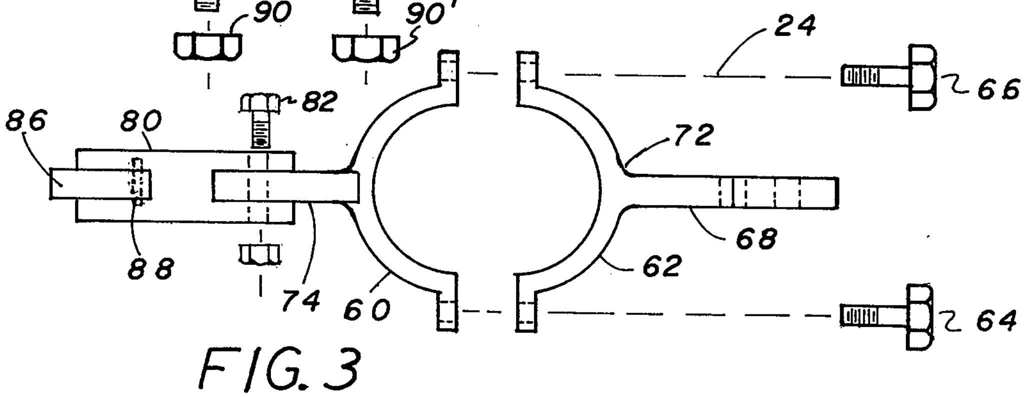
FIG. 3 is a top view of the latch of this invention showing one embodiment of the mounting bracket for mounting the latch to the wheelchair.
Figure 4:
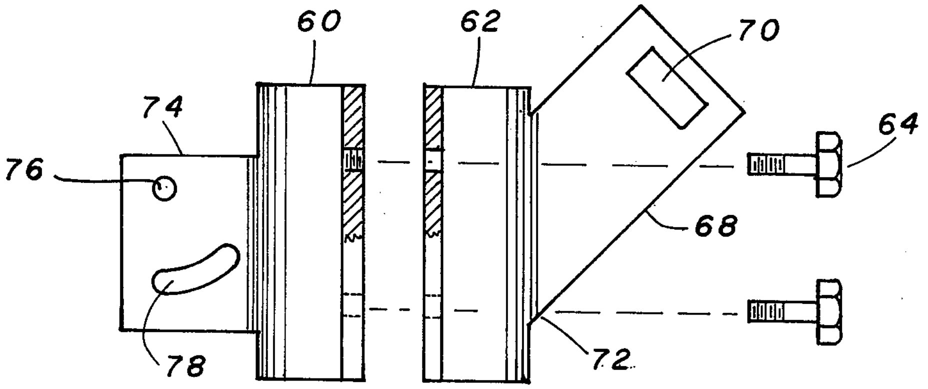
FIG. 4 is a side view of the attaching bracket of FIG. 3.

Referring now to FIG. 3 there is shown a top view of latching mechanism 24 and its support structure. As can be seen, the mounting structure for latching mechanism 24 includes two formed U brackets 60 and 62 which are held secured together around lower frame member 26 of the wheelchair by at least two nuts and bolts such as shown at 64 and 66. As can be seen more clearly in FIG. 4, member 68, to which is attached seat belt 32 by means of aperature 70, is permanently secured to bracket 62 by any suitable means including welding such as is indicated by weld bead 72. Attached to bracket 60, at a location opposite member 68 is mounting element 74. As can be seen more clearly in FIG. 4, mounting element 74 includes an aperature 76 and a slot 78. As can be seen from FIGS. 3, 4 and 5 in combination, the latching portion 80 of the mechanism 24 is securely mounted to mounting element 74 by means of nuts and bolts such as indicated by reference number 82. It should be noted, that in this described embodiment two nuts and bolts such as 82 are used to secure latching portion 80 to mounting element 74. As can be seen, one nut and bolt passes through aperature 76 located in element 74 and aperature 76' located in latching portion 80 whereas a second bolt passes through aperature 78' located in portion 80, and slot 78 located in mounting member 74. Thus, it can be seen that latching portion 80 can be adjusted to various angles by pivoting it around the bolt through aperature 76 and 76', as the bolt through aperature 78' and slot 78 is moved to the desired location. Once the desired position for latching portion 80 is obtained, the nuts and bolts through aperatures 76, 76', 78 and 78' are tightened to avoid further motion.

Figure 6:
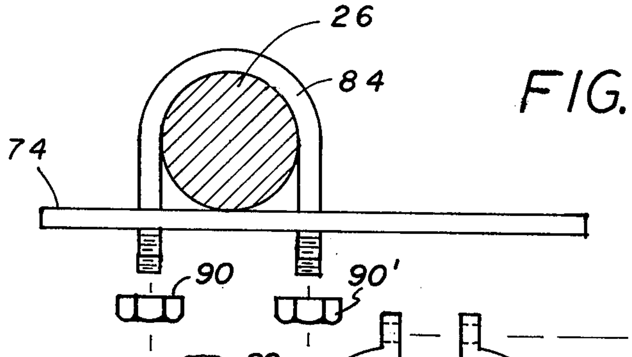
FIG. 6 is an alternate embodiment of a mounting bracket for attaching the latch of this invention to the wheelchair.

Referring to FIG. 6, there is shown another embodiment for mounting latching mechanism 24 to the wheelchair structure. According to this embodiment, mounting element 74 extends as a single piece of metal and includes aperatures for receiving one or more U bolts 84. U bolts 84 are then secured around the frame 26 of the wheelchair by means of nuts 90 and 90' against element 74.

Figure 5:
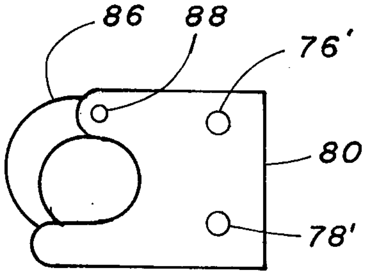
FIG. 5 is a side view of the latching mechanism shown in FIG. 3.

As can be seen from FIGS. 3 and 5, latching portion 80 further includes a latching tongue 86 which is attached to the frame of latching portion 80 by pin 88. As will be discussed hereinafter, latching tongue 86 pivots around pin 88 to provide an aperature suitable for receiving and holding horizontal bar 36 which is permanently attached to the two pillar standard 38. The details of this latching tongue will be discussed hereinafter.

Figure 7:
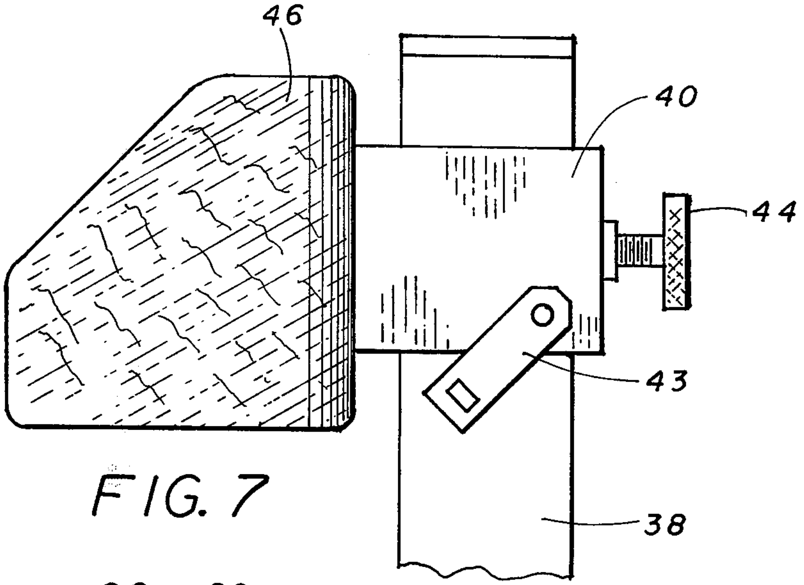
FIG. 7 is a side view of a head rest suitable for use with the present invention which mounts on the standards shown in FIG. 2.

Referring now to FIG. 7, there is shown a particularly suitable head rest for use with the apparatus of this invention. As can clearly be seen in FIG. 7, and as was discussed heretofore with respect to FIGS. 1 and 2, head rest 46 is made of resilient material such as foam rubber or the like. This resilient material is securely attached to a mounting bracket 40 which can slide up and down twin pillar standard 38 to the desired location. The head rest is then secured into the desired position by tightening thumb screws 44 and 44' against pillars 38. It can also be seen the shoulder portion 34 of the seat belt strap can be securely attached to the bracket 43 which in turn is securely attached to mounting structure 40.

Figure 9:
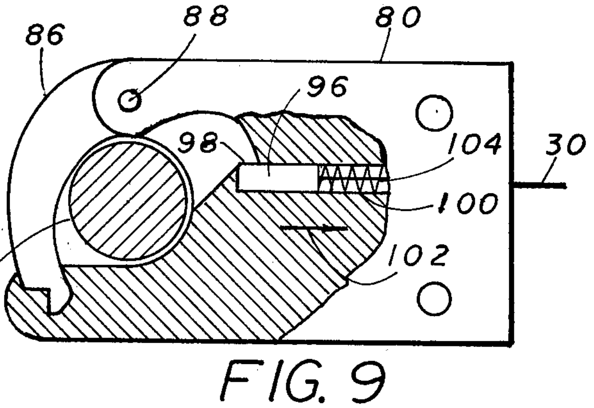
FIG. 9 is a partial cutaway view of the latch of FIG. 8 showing details of the locking pin and mechanism.
Figure 8:
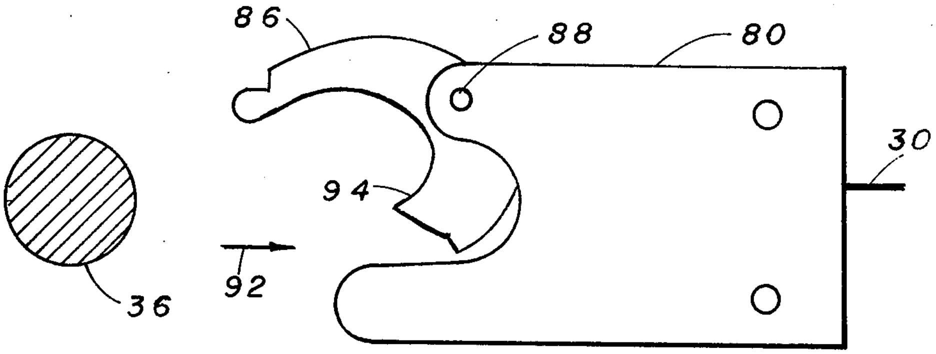
FIG. 8 is a side elevation view of the latch of FIG. 5 showing the lock and mechanism.

Referring now to FIGS. 8 and 9 there is shown details of the latching mechanism of this invention. FIG. 8 is similar to FIG. 5 except it shows the latching tongue 86 in the open position and ready to receive the bar 36 which is mounted to the two pillar standard 38 (bar 38 not shown in FIG. 5). As can be seen by moving latching means 80 towards bar 36 as is indicated by arrow 92, tongue 86 will tend to move down and enclose bar 36 as a result of pressure provided when bar 36 engages the end 94 of latching tongue 86. Thus as bar 36 moves into position it is latched securely by latching tongue 86 in the position shown in FIG. 5. As shown in FIG. 9, there is a partially cutaway view of the latching mechanism of this invention in a secured condition. As is seen, bar 36 is held in a secured position by latching tongue 86. Once latching tongue 86 is moved all the way into position as shown in FIG. 9, the latching tongue itself is held in the position by means of locking pin 96. As can be seen, locking pin 96 engages shoulder 98 of latching tongue 86 such that latching tongue 86 can no longer pivot around 88. Locking pin 96 is urged into position against shoulder 98 when locking tongue 86 is in the fully closed position by means of compressed spring 100. To release locking bar 36 from the latching mechanism, locking pin 96 is pulled in the direction indicated by arrow 102 by means of a flexible wire cable 30 which draws latching pin 96 back into cylindrical passage 104. As locking pin 96 is moved away from shoulder 98, latching tongue 86 is again free to rotate around pivot 88 and thus release bar 36.

Thus, referring to FIGS. 1, 2, 8 and 9 in combination the operation of the present apparatus can be understood. In operating the device of this invention, the occupant of the wheelchair once aboard the transport vehicle or within the structure which is expected to experience turbulence or bouncing first releases the latching tongue 86 so that it is in the open position as shown in FIG. 8, and then simply backs the wheelchair into position such that latching mechanism 24 engages bar 36. As the wheelchair continues in a backward motion, contact of bar 36 with shoulder 94 of latching tongue 86 forces the latching tongue into a closed position as is shown in FIG. 9. Once securely in place, and once shoulder 98 is rotated to the appropriate position, spring 100 urges pin 96 against shoulder 98 thereby securing latching tongue 86 into position which in turn secures bar 36 into position. It should be understood, that a wheelchair may well use two of the latching devices 24 to give more complete security. The wheelchair occupant may then further secure seat belt 32 to latching device 24. The shoulder belt 34 may then be secured. According to one embodiment, shoulder belt 34 is permanently attached to bracket 43 and may be releasably attached to seat belt 32 when desired. Thus, in this embodiment when shoulder belt 34 is not in use it remains with head rest 42. According to another embodiment, shoulder belt 34 is permanently attached to seat belt 32 and may be releasably attached to bracket 43 when desired. In this embodiment, the wheelchair occupant keeps the shoulder belt with the wheelchair. To release the wheelchair, shoulder belt 34 is released, either at bracket 34 or at seat belt 52 depending on the embodiment and then the wheelchair occupant simply squeezes squeeze handle 28, which results in pin 96 being moved backward by flexible cable 30 to compress spring 100. Once pin 96 has been moved free of shoulder 98 of latching tongue 86, the wheelchair occupant may then simply wheel the chair forward thereby pivoting locking tongue 86 out of the way as it clears bar 36. The wheelchair occupant has then completely cleared his chair of restraining bar 36 and may continue to manuver the wheelchair in any way he so desires. Seat belt 32 may, of course, be released at any time, or if desired remain secured.

Figure 10:
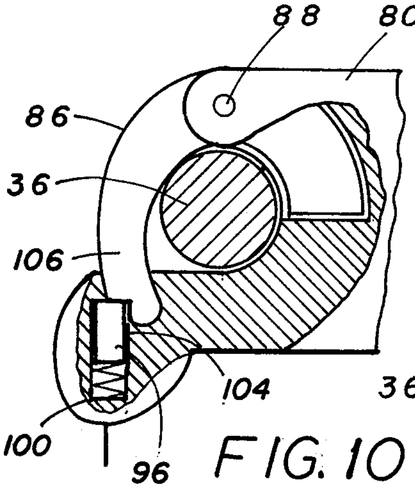
FIG. 10 shows an alternate embodiment of the latching mechanism of FIG. 9 with a different arrangement of a locking pin.

FIG. 10 shows an alternate embodiment of the latching mechanism. As is clearly seen in FIG. 10, the locking pin 96, cynlindrical passage 104, and spring 100, are located on latching portion 80 such that locking pin 96, engages end 106 of latching tongue 86.

Thus, although the present invention has been described with respect to specific embodiments of a wheelchair securing device it is not intended that such specific references be considered limitation upon the scope of this invention except insofar as set forth in the following claims.

What is claimed is:

1. Apparatus working in combination with a wheelchair for securing the wheelchair in a transport system, a vehicle or a structure subject to unpredictable motion, bouncing, and acceleration forces comprising;

a mounting standard securely mounted to the floor of said transport vehicle or structure, said mounting standard including a substantially horizontal bar permanently mounted thereto at a preselected distance above said floor;

a latching mechanism securely mounted to said wheelchair at said preselected location above said floor, said latching mechanism including means for mounting to said wheelchair, a latching portion and a latching tongue pivotally mounted to said latching portion such that said latching portion and said latching tongue cooperate to form a channel which channel may be selectively closed by said pivoting latching tongue such that said tongue and latching portion define an aperature suitable for receiving said horizontal bar, said latching mechanism further including a spring loaded locking pin for locking said tongue in said closed position; and means for moving said locking pin from said locking position to release said latching tongue.

2. The apparatus of claim 1 wherein said means for moving includes a wire cable having a first and a second end, said first end being attached to said locking pin, said means for moving further including a squeeze handle attached to said second end of said wire cable such that squeezing said squeeze handle results in movement of said wire cable which in turns results in said cable moving said locking pin to the unlocked position.

3. The apparatus of claims 1 or 2 and wherein said latching mechanism further includes means for attaching a seat belt.

4. The apparatus of claims 1 or 2 and wherein said mounting standard further includes an adjustable head rest.

5. The apparatus of claims 1 or 2 wherein said means for mounting further includes two U shaped clamp portions which receive a frame member of said wheelchair; and fastening means to secure said two U shaped clamp portion to said frame member.

6. The apparatus of claim 1 or 2 wherein said body is adjustably secured to said mounting means such that said latching mechanism can be adjusted to properly engage said horizontal bar.

* * * * *